United States Patent [19]

Hayakawa

[11] Patent Number: 5,033,043
[45] Date of Patent: Jul. 16, 1991

[54] OPTICAL HEAD APPARATUS FOR OPTICAL DISKS

[75] Inventor: Toshiro Hayakawa, Tokyo, Japan

[73] Assignee: Eastman Kodak Company, Rochester, N.Y.

[21] Appl. No.: 385,592

[22] Filed: Jul. 10, 1989

[30] Foreign Application Priority Data

Apr. 19, 1989 [JP] Japan .................................. 1-101172

[51] Int. Cl.⁵ ......................... G11B 7/00; G11B 17/22
[52] U.S. Cl. .................................... 369/121; 369/112; 369/32
[58] Field of Search ............... 369/116, 110, 121, 112, 369/32, 44.12; 307/425, 427; 350/354, 353, 390, 3.75; 365/120, 124

[56] References Cited

U.S. PATENT DOCUMENTS 4,771,415 9/1988 Taki ..................................... 369/121

Primary Examiner—Roy N. Envall, Jr.
Assistant Examiner—Hindi Nabil
Attorney, Agent, or Firm—Raymond L. Owens

[57] ABSTRACT

An optical head apparatus for optical disks has a recording and reading laser beam generator and a wavelength reducer including reducing the wavelength of light from the laser generator. The laser beam generator is a separate unit from the head slider portion, the two being connected by an optical fiber which is used to transmit the recording and reading laser light to the slider. This arrangement enables short-wavelength laser light below 550 nm to be used for writing and reading operations without increasing the weight of the slider, thereby offering high-speed access and high recording densities.

4 Claims, 3 Drawing Sheets

OPTICAL HEAD APPARATUS FOR OPTICAL DISKS

BACKGROUND OF THE INVENTION

1. Field of the Invention

The present invention relates to optical head apparatus for optical disks that is suited for the recording and reading of short wavelength laser light.

2. Description of the Prior Art

With the advent of the electronic information age, the quantity of information that has to be handled has recently been growing at a tremendous pace. This has led to an increase in research and development work related to optical disks, which offer high storage density, large capacity and random access capability. There are read-only optical disks, write-once optical disks, and erasable optical disks. The read-only type has already been made into a commercial product in the form of the Company Disk.

In write-once disk systems and erasable disk systems, a beam of laser light is used to record information on, and read information from, a disk that is being rotated by a spindle. In most cases, the laser light source is a laser diode, a device that is lightweight and compact enough to be fabricated on a chip that measures 0.5 mm or less.

FIG. 3 is a drawing showing the general construction of the type of conventional optical head apparatus that is used for recording and reading information on write-once optical disks and erasable optical disks. Typically, the light source is an AlGaAs laser diode 1 that outputs infrared light having a wavelength of 730 nm to 830 nm which, together with various optical components such as servos for focusing and tracking, forms a slider member 18 that moves axially with respect to the spinning disk 20 for recording and reading information at specific locations on the disk 20.

When information is to be recorded, the laser diode 1 is operated by a drive circuit (not shown) to emit a beam of laser light in accordance with the information to be recorded. The laser beam thus emitted is divergent, and it is therefore first passed through a collimator lens 12 to form it into a parallel beam which, after passing through a beam splitter 18a and a right-angle prism 18b, impinges on a focusing lens 18c which condenses the incident laser light. If the aperture number of the focusing lens 18c is NA, for a laser beam of wavelength $\lambda$, the diameter d of the laser beam coming from the focusing lens 18c that will be projected at specific locations on the spinning disk 20 will be:

$$d = 0.82\lambda/NA \qquad (1)$$

The laser beam impinging on the disk 20 melts and deforms the recording layer, or changes it from an amorphous state to a crystalline state or, in thee case of a magneto-optical disk, reverses the orientation of the magnetization, thereby recording the desired information on the disk 20 as a pattern of information-carrying regions that are referred to as pits.

Information thus recorded is read form the disk by using a laser beam of a lower power than the laser beam used for the recording. The laser beam is reflected from the disk and passes through the beam splitter 18a and condenser lens 14 and impinges on a photodetector 18d, which detects the changes in reflectance between pits and non-pit portions which corresponds to the information to be reproduced.

However, with the recent remarkable progress in the technology of semiconductor memories, magnetic memories and other such memory media, there has arisen an urgent need to also increase the recording density of optical disks.

The recording density of write-once disks and erasable disks is defined by the size of the pits, while the size of the pits is, in turn, determined by the diameter of the laser beam used in the recording process. The minimum beam diameter is set by the diffraction limit of the light, and as shown by equation (1), this is proportional to the wavelength $\lambda$ of the laser light impinging on the focusing lens. It follows, therefore, that the wavelength of the laser light has to be shortened in order to raise the recording density of optical disks.

At present, however, the shortest wavelength that can be achieved with the small, lightweight laser diodes in use is 670 nm, using an AlGaInP laser diode. To obtain laser light having a wavelength shorter than 600 nm would require the use of a large argon gas laser, which would make the system much larger.

One solution that has been tried is to have a laser diode as the light source and use a non-linear optical crystal to reduce the wavelength of the light generated by the laser diode. However, the optical components have to be mounted on the slider member. This has an adverse affect on system performance, because it increases the weight and size of the slider member, slowing its access speed.

SUMMARY OF THE INVENTION

The object of the present invention is to provide an optical head apparatus for optical disks which has a fast access speed and employs a short wavelength laser light beam for information recording and reading, enabling a higher recording density to be achieved.

To attain this object, the present invention comprises an optical head apparatus for optical disks having a slider member than can move radially with respect to a spinning optical disk which records and reads information by projecting a beam of laser light onto the disk, comprises a recording and reading laser beam generator means which includes a laser light generating means section and wavelength reduction means for reducing the wavelength of each light from the laser oscillation section, an optical fiber connecting the laser beam generation means to the slider member for furnishing the slide member with recording and reading laser light from the laser beam generating means.

As in accordance with the present invention thus configured the laser beam generation means is provided separately from the moveable portion used to access specific locations on the disk, the weight of the slide member is not increased by the introduction in the laser beam generation means of optical components such as non-linear optical crystal for reducing the wavelength of the laser light.

The laser beam generation means and the slider member are connected together by an optical fiber having excellent flexibility which can be treated just like the electrical wires connected to the slider member, thereby enabling short-wavelength light to be used for recording and reading operations without any deterioration in the access speed of the slider member.

Further features of the invention, its nature and various advantages will be more apparent from the accompanying drawings and the following detailed description of the invention.

DETAILED DESCRIPTION OF THE PREFERRED EMBODIMENT

Figure 1:
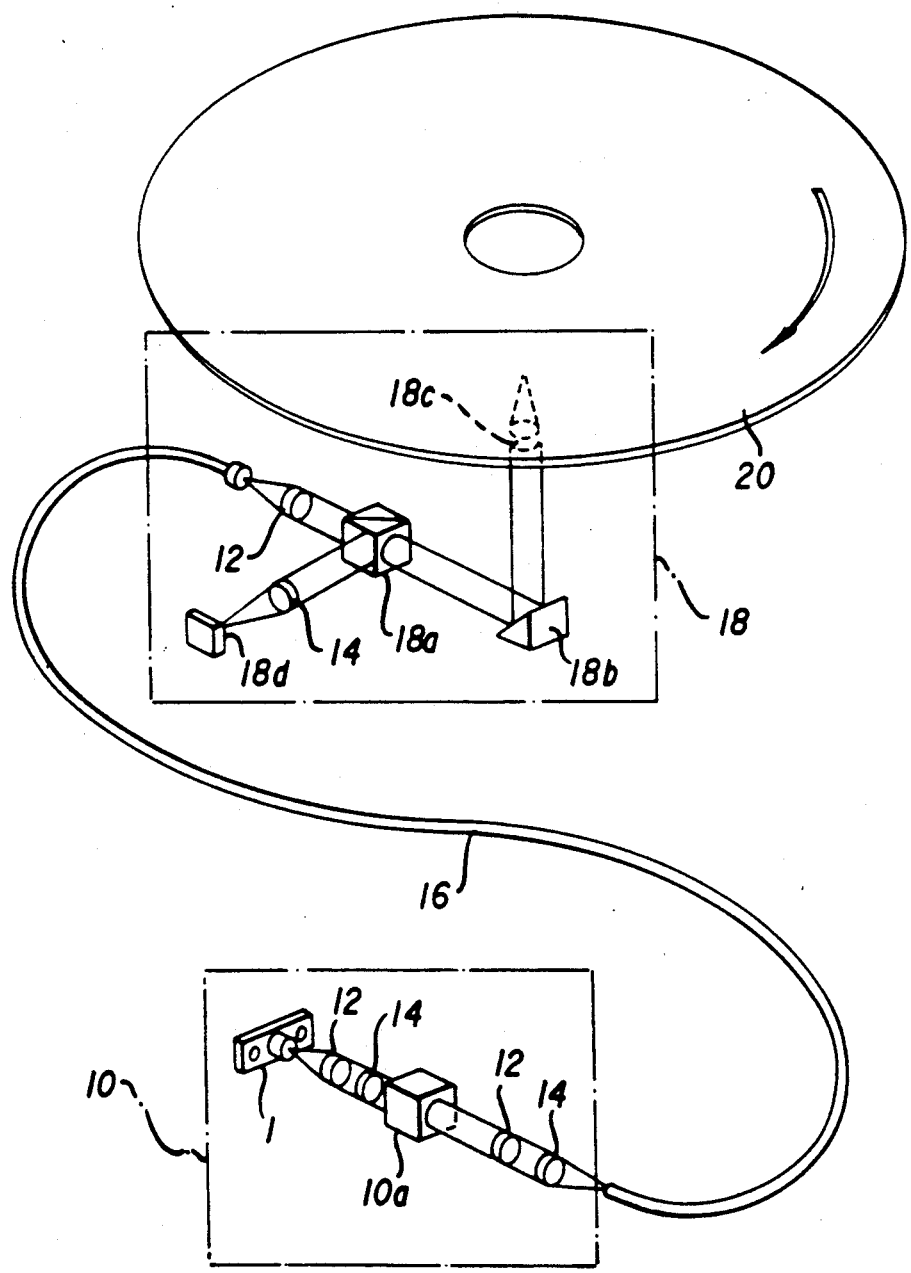
FIG. 1 shows the general construction of a first embodiment of the present invention.

FIG. 1 shows the general construction of a first embodiment of the present invention. Laser light generation means 10 is comprised of an AlGaAs laser diode 1, a collimator lens 12, condenser lens 14, and non-linear optical crystal 10a of KDP (potassium dihydrogen phosphate) as the means used for reducing the wavelength of the laser light. The laser diode 1, driven by a laser diode drive circuit (not shown), emits a beam of laser light that has a wavelength of 780 nm. After the laser beam has been collimated by the collimator lens 12 and condensed by the condenser lens 14, it impinges on the non-linear optical crystal 10a. Non-linear optical crystal such as KDP exhibits a non-linear polarization that is not proportional to the electrical field strength of the incident laser light. As a result, the emergent beam of laser light has twice the frequency of the incident light; that is, the wavelength is halved.

The resultant 390 nm laser light from the non-linear optical crystal 10a is passed through the collimator lens 12 and condensed by the condenser lens 14, and is then fed to an optical fiber 16. The other end of the optical fiber is connected to the slider member 18 which is comprised of the collimator lens 12, beam splitter 18a, right-angle prism 18b, focusing lens 18c and photodetector 18d. Laser light having a wavelength of 390 nm provided by the laser light generation means 10 passes through the beam splitter 18a, right-angle prism 18b and focusing lens 18c, as in a conventional arrangement, to direct it onto the disk 20.

Thus, this embodiment enables the disk to be irradiated by a beam of laser light having a wavelength that is half the conventional wavelength, thus realizing a minimum beam diameter that is half the conventional beam diameter and pits that are one-fourth the size of conventional pits, thereby raising the recording density.

Figure 2:
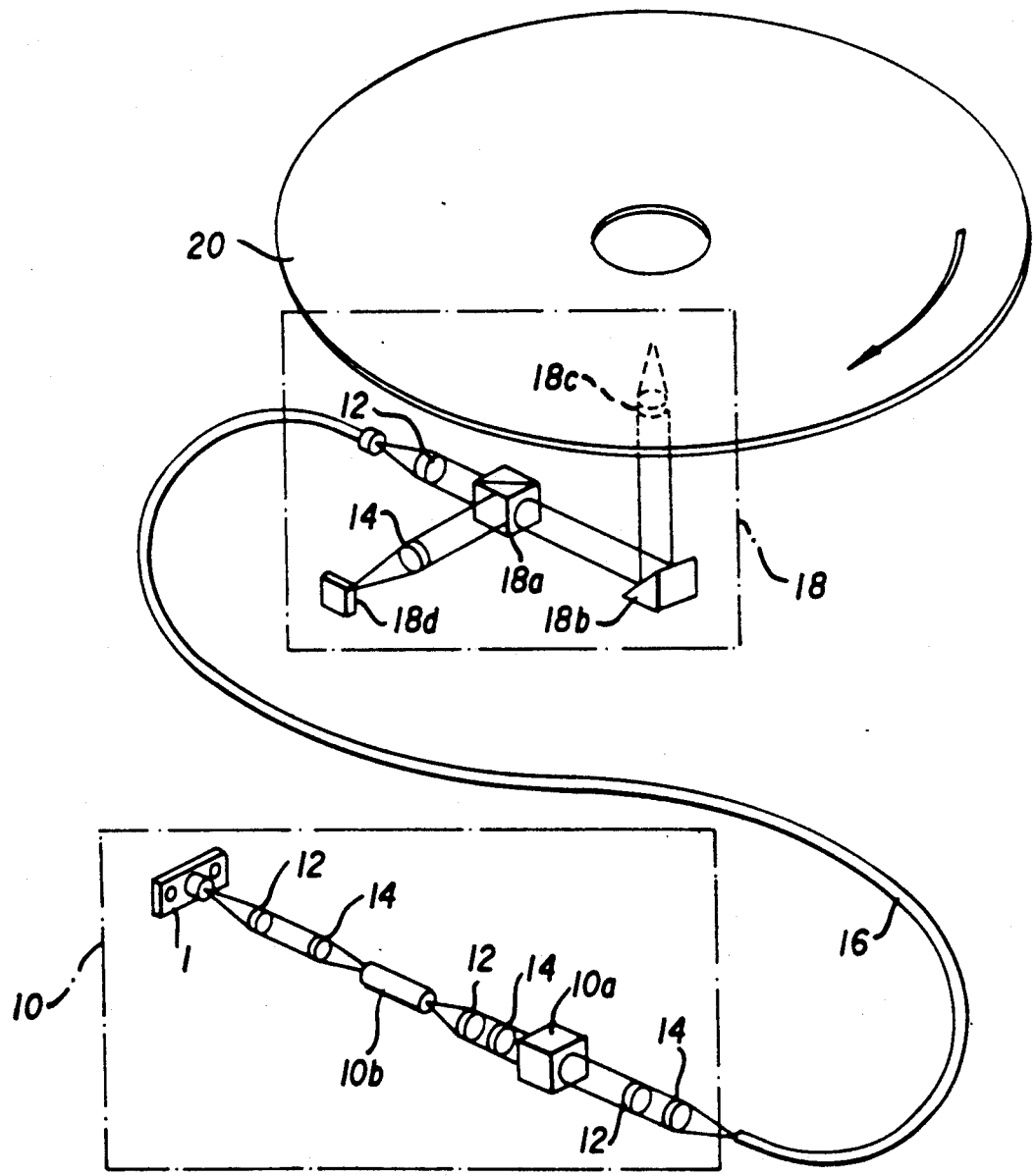
FIG. 2 shows the general construction of a second embodiment of the present invention.
Figure 3:
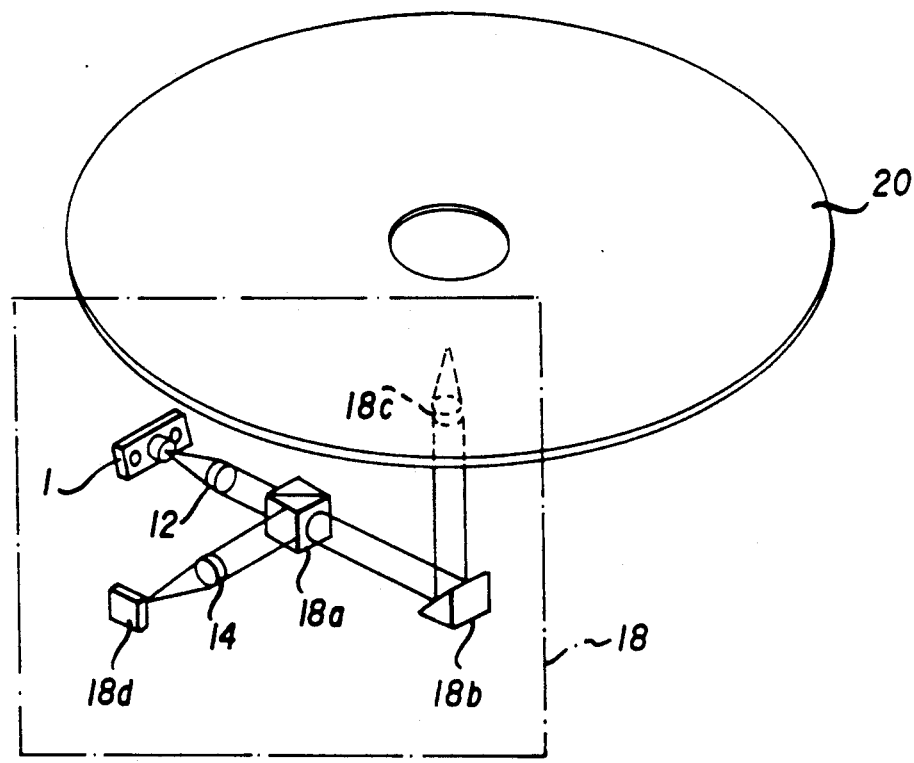
FIG. 3 is a drawing showing the general structure of a conventional optical head apparatus.

FIG. 2 shows the general construction of a second embodiment of the present invention. In the second embodiment, a high power Nd:YAG solid-state laser is employed for the laser light generation means 10. The laser beam emitted by the non-linear optical 12 and condenser lens 14 to impinge on an Nd:YAG rod 10b to obtain a high-power laser beam having a wavelength of 1060 nm.

As in the first embodiment, non-linear optical crystal KDP is used to reduce the wavelength of the light and an optical fiber 16 is used to transmit the light to the moving member 18, from where the beam of 560 nm laser light is directed onto the disk.

Use of this type of solid-state laser provides a high output of 0.5 to 1 watt or more. This has the advantage that, even if a broad-stripe or array type high-output semiconductor laser is used in which the spatial mode characteristics are inferior to normal semiconductor lasers with outputs of several tens of milliwatts, the solid-state laser can still be used to excite a stable spatial mode.

A further advantage of using the optical fiber coupling of this invention is that, by inputting part of the laser light from the non-linear optical crystal into the fiber and extracting only the light guided by the optical fiber from the output end of the slider member side, it can be used as a space filter or mode shaper by combining an appropriate fiber and optical system. Even if short-wavelength light is used, which usually has inadequate mode characteristics, an advantage is that the type of high-quality laser spot that is required by optical disks can be obtained.

Although KDP is used as a non-linear optical crystal 10a in each of the embodiments, it is to be understood that the invention is not limited to KDP. ADP (ammonium dihydrogen phosphate), LiNbO$_3$, LiIO$_3$, and Ba$_2$NaNbO$_{15}$ are some examples of other substances that may instead be used. It is also to be understood that the slider member is not limited to the arrangement described in the embodiments. Various other arrangements are possible, such as those in which an excitation coil or polarizing plate, for example, are provided for magneto-optical disk applications.

As described above, the optical head apparatus according to the invention enables recording and reading of information on write-once and erasable optical disks using short-wavelength laser light below 550 nm without increasing the weight of the optical head slider member, enabling high-speed access and high recording densities to be achieved.

The invention has been described in detail with particular reference to certain preferred embodiments thereof, but it will be understood that variations and modifications can be effected within the spirit and scope of the invention.

What is claimed is:

1. An optical head apparatus for optical disks having a slider member that can move radially with respect to a spinning optical disk which records and reads information by projecting a beam of laser light from the slider member onto the disk, comprising:

short wavelength laser beam generating means separate from the slider member which includes means for producing a beam of laser light and wavelength reduction means for reducing the wavelength of the laser light beam; and a fiber optic member connecting the short wavelength laser beam generating means to the slider member for furnishing the slider member with reduced wavelength laser light.

2. The apparatus as set forth in claim 1 wherein the wavelength reduction means includes a non-linear circuit crystal which produces laser light below 550 nm.

3. The apparatus as set forth in claim 2 wherein the laser beam generating means includes a laser diode.

4. The apparatus as set forth in claim 2 wherein the laser beam generating means includes a high powered solid-state laser.

* * * * *